United States Patent [19]

Kinoshita et al.

[11] Patent Number: 4,994,339

[45] Date of Patent: Feb. 19, 1991

[54] ELECTROPHOTOGRAPHIC PHOTORECEPTOR USING TITANYL PHTHALOCYANINE

[75] Inventors: Akira Kinoshita; Kazumasa Watanable; Naohiro Hirose; Akihiko Itami; Kiyoshi Sawada, all of Hino, Japan

[73] Assignee: Konica Corporation, Tokyo, Japan

[21] Appl. No.: 461,257

[22] Filed: Jan. 5, 1990

[30] Foreign Application Priority Data

Jan. 9, 1989 [JP] Japan ................................. 1-3407

[51] Int. Cl.$^5$ ........................... G03G 5/06; G03G 5/14
[52] U.S. Cl. ..................................... 430/78; 540/141; 430/60
[58] Field of Search ..................... 430/76, 77, 78, 57, 430/58; 540/141

[56] References Cited

U.S. PATENT DOCUMENTS 4,728,592 3/1988 Ohaku .................................. 430/76

Primary Examiner—David Welsh
Attorney, Agent, or Firm—Jordan B. Bierman

[57] ABSTRACT

The present invention relates to an electrophotographic photoreceptor containing titanyl phthalocyanine in a crystalline state that has a maximum intensity peak of the Bragg angle $2\theta$ at $27.2° \pm 0.2°$ crystal planes corresponding to diffraction lines at $9.6° \pm 0.2°$, $11.7° \pm 0.2°$ and $24.2° \pm 0.2°$ in a diffraction spectrum obtained with characteristic X-rays of Cu K$\alpha$ at a wavelength of 1.541 Å, and that also has an aggregated state such that a visible and near infrared absorption spectrum has a maximum absorption in the range of 780–860 nm, said photoreceptor further containing an ethylene copolymer resin and/or a polyamide resin in an intermediate layer provided between a light-sensitive layer and an electroconductive layer or an electroconductive substrate.

19 Claims, 5 Drawing Sheets

ELECTROPHOTOGRAPHIC PHOTORECEPTOR USING TITANYL PHTHALOCYANINE

BACKGROUND OF THE INVENTION

The present invention relates to an electrophotographic photoreceptor, in particular, one that is suitable for use with printers, copiers, etc. and which shows high sensitivity to light from LEDS and Laser Diode. Electrophotographic photoreceptors having high sensitivity to visible light are used extensively with copiers, printers, etc.

Most common photoreceptors that are used in these applications are inorganic photoreceptors provided with light-sensitive layers that are chiefly composed of inorganic photoconductive materials such as selenium, zinc oxide and cadmium sulfide. However, such inorganic photoreceptors are not completely satisfactory in such characteristics as photosensitivity, heat stability, moisture resistance and durability that are required of electrophotographic photoreceptors to be used with copiers, printers, etc. For instance, selenium will crystallize upon heating or exposure to dirt such as sebum, often leading to deterioration of the photoreceptors that use it as a photoconductor. Photoreceptors that use cadmium sulfide are low in moisture resistance and durability, whereas those using zinc oxide are poor in durability. Further, photoreceptors using selenium or cadmium sulfide are subject to great restraints during manufacture and handling because of the toxicity of these materials.

With a view to solving these problems with inorganic photoconductive materials, attempts have been made to use a variety of organic photoconductive materials in the light-sensitive layers of photoreceptors and active R&D efforts are being made today along this line. For example, Japanese Patent Publication No. 50-10496 describes an organic photoreceptor having a light-sensitive layer containing polyvinylcarbazole and trinitrofluorenone. However, even this photoreceptor is not completely satisfactory in terms of sensitivity and durability. To overcome this problem, an electrophotographic photoreceptor of a functionally separated type in which carrier generating and transporting capabilities are individually fulfilled by different materials has been developed. In this type of photoreceptors, suitable materials can be selected from a broad range of choices and hence a photoreceptor having desired characteristics can be obtained fairly easily. For these reasons, it is anticipated that an organic photoreceptor having high sensitivity and durability can be produced using the concept of function separation.

Various organic dyes and pigments have so far been proposed for use as carrier generating materials in functionally separated electrophotographic photoreceptors and those which are used commercially include polycyclic quinone compounds typified by dibromoanthanthrone, pyrylium compounds, eutectic complexes of pyrylium compounds and polycarbonates, squarium compounds, phthalocyanine compounds, azo compounds, etc.

However, many of these carrier generating materials are predominantly sensitive to the short or medium wavelength range of visible light and they are not suitable for use in photoreceptors on laser printers that employ semiconductor lasers as light sources since they do not have the necessary sensitivity in the operating wavelength range of 750–850 nm. Certain azo compounds are phthalocyanine compounds have been found to have predominant sensitivity in a wavelength range longer than 750 nm. These compounds are provided with a specific aggregated or crystalline structure not only to shift the predominant absorption to the longer wavelength range but also to enhance their ability to generate carriers. To design these compounds, reviewing the conditions for their production and those for fabricating photoreceptors is important. Because of these technical complexities, no carrier generating materials have been discovered that are satisfactory in all aspects including chargeability, sensitivity and resistance to cyclic use and an electrophotographic photoreceptor having high performance is yet to be developed.

In ordinary electrophotographic photoreceptors, the electrical contact between a grounded conductive layer and a light-sensitive layer is not microscopically uniform and the efficiency of carrier injection from the conductive layer may differ from one site to another, creating local differences in the distribution of electric charges held on the photoreceptor's surface. These differences will become visible as image defects after development, which are white spots in the black background in a positive-working development process or black spots in the white background in a negative-working reversal development process. In particular, black spots appearing in a reversal development process are as deleterious to image quality as background fogging.

With a view to solving these problems, it has been proposed that an intermediate layer be provided between a conductive layer and a light-sensitive layer so as to block carrier injection into the light-sensitive layer. However, as the blocking characteristic increases, the sensitivity of the photoreceptor will decrease or the residual potential remaining after exposure will increase. Thus, an optimum combination of materials for light-sensitive layer and intermediate layer has not yet been discovered that is capable of blocking carrier injection without suffering the disadvantages described above.

SUMMARY OF THE INVENTION

An object, therefore, of the present invention is to provide an electrophotographic photoreceptor that has high sensitivity and which yet produces low residual potential after exposure.

Another object of the present invention is to provide an electrophotographic photoreceptor that has a satisfactory sensitivity to a light source such as Laser Diode that emits light at long wavelengths.

Still another object of the present invention is to provide an electrophotographic photoreceptor that produces few image defects, in particular, black spots when processed by reversal development.

These objects of the present invention can be attained by an electrophotographic photoreceptor containing titanyl phthalocyanine in a crystalline state that has a maximum intensity peak of the Bragg angle $2\theta$ at $27.2° \pm 0.2°$ and crystal planes corresponding to diffraction lines at $9.6° \pm 0.2°$, $11.7° \pm 0.2°$ and $24.1° \pm 0.2°$ in a diffraction spectrum obtained with characteristic X-rays of Cu Kα at a wavelength of 1.541 Å, and that also has an aggregated state such that a visible and near infrared absorption spectrum has a maximum absorption in the range of 780–860 nm, said photoreceptor further containing an ethylene copolymer resin and/or a polyamide resin in an intermediate layer provided between a light-sensitive layer and an electroconductive layer or an electroconductive substrate.

DETAILED DESCRIPTION OF THE INVENTION

Figure 1:
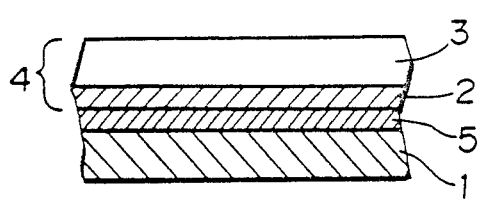
FIGS. 1-3 are cross-sectional views showing specific embodiments of the layer arrangement for the electrophotographic photoreceptor of the present invention.

The present invention is described hereinafter in detail. Ethylene copolymer resins and polyamide resins in an intermediate layer may be used either on their own or as admixtures. Ethylene copolymer resins to be used in the present invention are copolymers containing alkylene monomers such as ethylene and propylene. Preferred alkylene monomers are echylene. Illustrative copolymerizable monomers include vinyl acetate, acrylic acid, methacrylic acid, acrylate esters, methacrylate esters, vinyl alcohol, vinyl chloride, vinylidene chloride, vinyl fluoride, acrylonitrile, vinyl acetal, maleic acid, maleic anhydride, hydroxystyrene, acrylamide and vinylpyrrolidone. Preferred comonomers include vinyl acetate, acrylic acid, methacrylic acid, maleic acid, acrylate esters and methacrylate esters.

These comonomers preferably occupy 5-50 wt %, more preferably 10-40 wt %, of the etylene copolymer. If their content is less than 5 wt %, the resulting resin does not have desired properties such as high solubility, good adhesion and ease of coating. If the content of comonomers exceeds 50 wt %, the blocking capability of the resin will decrease markedly. The ethylene copolymer desirably has a molecular weight ranging from 2 to 500 g/10 min in terms of MFR (melt flow rate as measured by the method described in JIS K 6730-1981).

Commercially available resins that can be used as the ethylene copolymer resin in the present invention are listed below:

Sumitate HE-10 (product of Sumitomo Chemical Co., Ltd.),

Sumitate KA-10, Sumitate KA-20, Sumitate KA-31, Sumitate KC-10 and Sumitate KE-10;

Acrift WH-302 (product of Sumitomo Chemical Co., Ltd.),

Acrift WK-402 and Acrift WM-506;

Evaflex A-703 (product of Mitsui Du Pont Polychemical Co., Ltd.) and Evaflex A-704;

New Crel N-010 (product of Mitsui Du Pont Polychemical Co., Ltd.), New Crel N-035 and New Crel N-1560;

Yukaron A-200K (product of Mitsubishi Petrochemical Company Ltd.), Yukaron A-210M, Yukaron A-210S, Yukaron A-220M, Yukaron A-500W, and Yukaron A-510W;

Primacol 5980 (product of Dow Chemical Company); NUC-6570 (product of Nippon Yunikar Co., Ltd.) and NUC-6070;

NB-730 (product of Nippon Yunikar Co., Ltd.) and MB-870.

Typical examples of the polyamide resin that is used in the present invention are nylon resins, and copolymer nylons as well as nylon resins that have been modified to become soluble in water or alcohols are particularly preferred. Examples of such nylon resisns are listed below:

Lakkamide 5003 (product of Dainippon Ink & Chemicals, Inc.) and Lakkamide 5216;

CM 4000 (product of Toray Industries, Ltd.) and CM 8000;

AQ Nylon A-70 (product of Toray Industries, Ltd.), AQ Nylon A-90 and AQ Nylon P-70;

Tresin F30 (product of Teikoku Kagaku Sangyo K.K.), Tresin MF-30, Tresin EF-30T, Tresin M-20, Tresin FS-350 and Tresin FS-500.

The thickness of the intermediate layer used in the present invention is not limited to any particular value but in order to avoid any damage to sensitivity characteristics, the intermediate layer is preferably not thicker than 10 μm, more preferably not thicker than 4 μm.

The X-ray diffraction spectrum of the titanyl phthalocyanine to be used in the present invention was measured under the following conditions and "peaks" in the spectrum are acute-angled projections that are clearly distinguishable from noise:

| X-ray tube | Cu |
|---|---|
| Voltage | 40.0 kV |
| Current | 100 mA |
| Start angle | 6.00 deg. |
| Stop angle | 35.00 deg. |
| Step angle | 0.020 deg. |
| Time of measurement | 0.50 sec. |

The absorption spectrum is one of a reflection type which was obtained by performing measurement with Model 320 Auto-recording Spectrophotometer of Hitachi Ltd.

The method for preparing the titanyl phthalocyanine that is to be used in the present invention is hereunder described by way of example. First, titanium tetrachloride is reacted with phthalodinitrile in an inert, high-boiling point solvent such as α-chloronaphthalene. The reaction temperature usually ranges from 160° to 300° C., with the range of 160°-260° C. being preferred. The resulting dichlorotitanium phthalocyanine is hydrolyzed with a base or water to obtain titanyl phthalocyanine, which is subsequently treated with a solvent to obtain the desired crystal-line form. The treatment with a solvent may be performed with a common stirrer but other apparatus can also be employed such as a homomixer, a disperser, an agitator, a ball mill, a sand mill or an attritor.

The titanyl phthalocyanine described above may be used in combination with other carrier generation materials in the present invention. Carrier generation materials useful for this purpose are titanyl phthalocyanine compounds having different crystalline forms than the titanyl phthalocyanine to be used in the present invention, such as u-titanyl phthalocyanine, β-titanyl phthalocyanine, titanyl phthalocyanine of mixed α-and β-forms, and amorphous titanyl phthalocyanine. Phthalocyanine pigments other than those listed above, azo pigments, anthraquinone pigments, perylene pigments, polycyclic quinone pigments, squarium pigments, etc. may also be used.

Various carrier transport materials may be used in the electrophotographic photoreceptor of the present invention and representative examples include compounds having nitrogenous heterocyclic nuclei or condensed rings thereof as typified by oxazole, oxadiazole, thiazole, thiadiazole and imidazole, polyarylalkane compounds, pyrazoline compounds, hydrazone compounds, triarylamine compounds, styryl compounds, styryltriphenylamine compounds, β-phenylstyryl triphenylamine compounds, butadiene compounds, hexatriene compounds, carbazole compounds, and condensed polycyclic compounds.

Specific examples of such carrier transport materials are described in Unexamined Published Japanese Patent Application No. 61-107356 and the structures of typical examples are shown below:

T-1
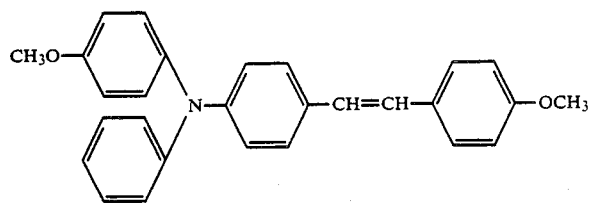

T-2
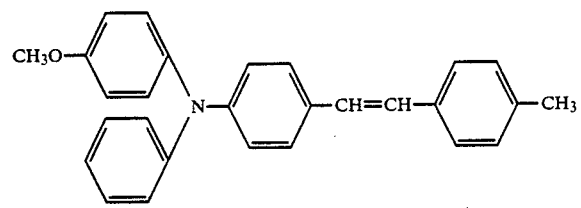

T-3
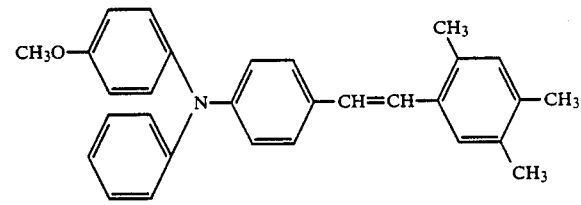

T-4
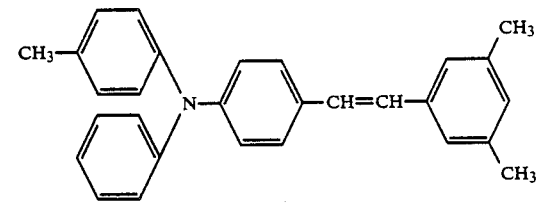

T-5
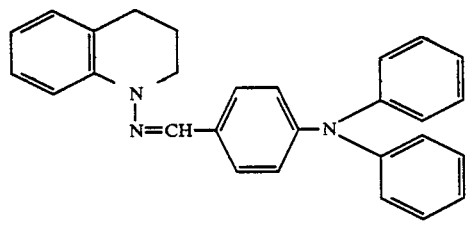

T-6
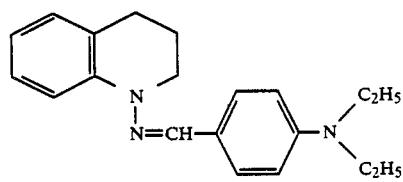

-continued
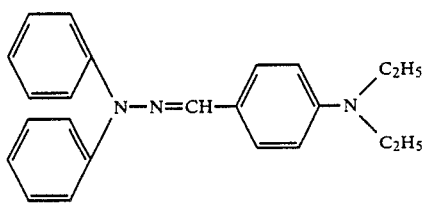
T-7
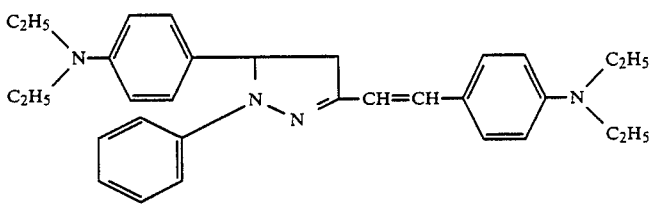
T-8
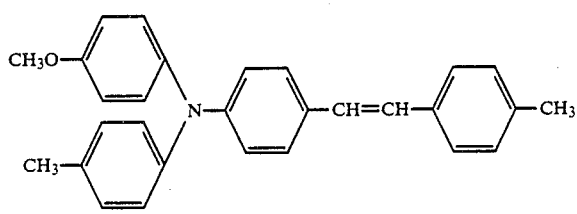
T-9
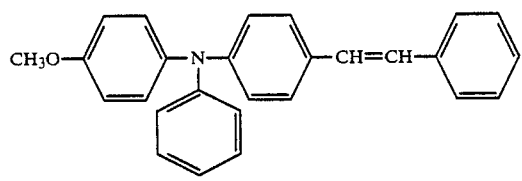
T-10
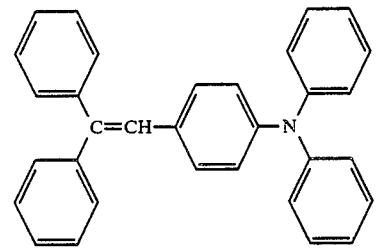
T-11
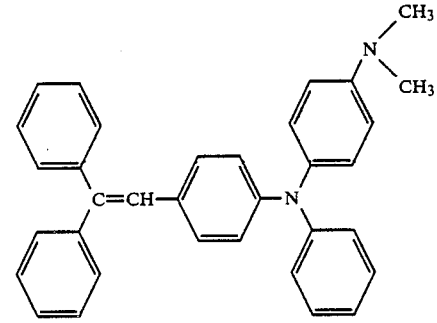
T-12
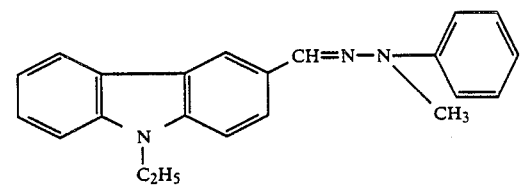
T-13

-continued

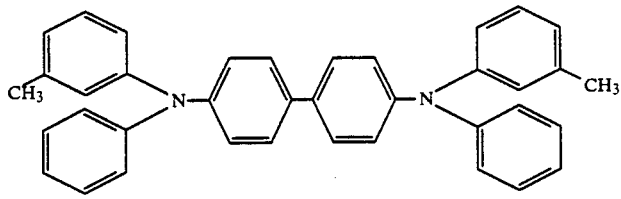
T-14

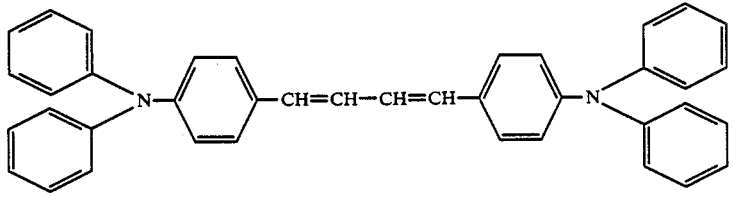
T-15

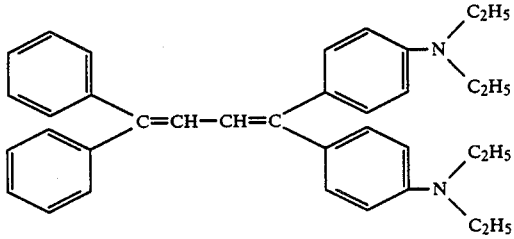
T-16

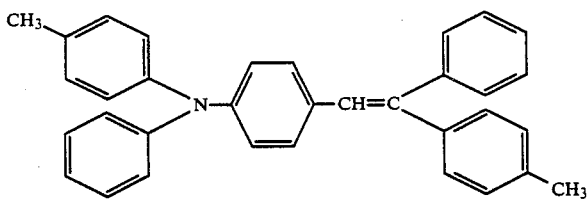
T-17

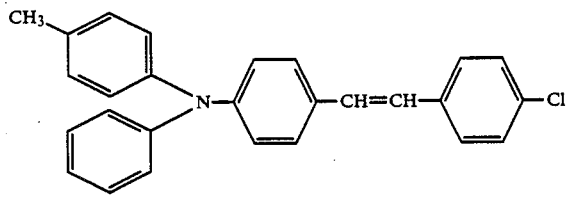
T-18

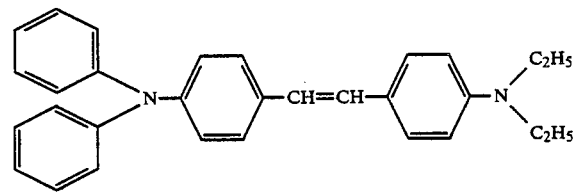
T-19

Figure 2:
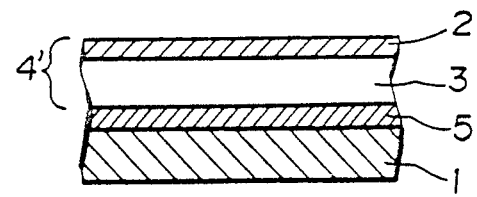
Figure 3:
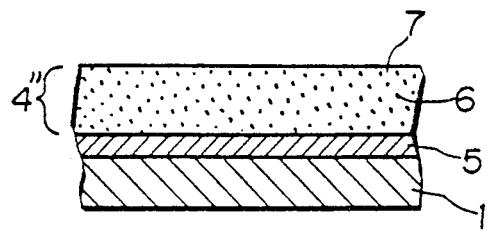

Photoreceptors are known to be fabricated in various forms of structure and the electrophotographic photoreceptor of the present invention may assume any of these forms. Desirably, it is a functionally separated photoreceptor of either superposition or dispersion type. Common examples of the layer arrangement for a functionally separated photoreceptor is shown in FIGS. 1-3. The layer arrangement shown in FIG. 1 comprises a conductive support 1 which is coated with an intermediate layer 5, on which are superposed a carrier generation layer 2 and a carrier transport layer 3 to form a light-sensitive layer 4. In FIG. 2, the arrangement of carrier generation layer 2 and carrier transport layer 3 is reversed to form a light-sensitive layer 4'. FIG. 3 shows a single-layer arrangement in which an intermediate layer 5 is provided on the conductive support 1 and on this intermediate layer is formed a light-sensitive layer 4" containing a carrier generation material 6 and a carrier transport material 7 dispersed therein.

The light-sensitive layer is advantageously formed by coating a carrier generation or transport material either on its own or as a solution having said material dissolved therein together with a binder or a suitable additive. Since carrier generation materials usually have low solubility, it is effective to apply a solution having these carrier generation materials dispersed as fine particles in suitable dispersion media using a dispersing machine such as an ultrasonic disperser, ball mill, sand mill or a homo-mixer. In this case, binders and other additives are usually added to the resulting dispersion.

A broad range of solvents or dispersion media may be used to form the light-sensitive layer and illustrative examples include: butylamine, ethylenediamine, N,N-dimethylformamide, acetone, methyl ethyl ketone, cyclohexanone, tetrahydrofuran, dioxane, ethyl acetate, butyl acetate, methyl cellosolve, ethyl cellosolve, ethylene glycol dimethyl ether, toluene, xylene, acetophenone, chloroform, dichloromethane, dichloroethane, trichloroethane, methanol, ethanol, propanol and butanol.

If a binder is to be used in forming carrier generation or transport layer, said binder may be of any type but it is desirable to use a high-molecular weight polymer that is hydrophobic and that has a film-forming capability. Non-limiting examples of such polymers are listed below:

| | |
|---|---|
| polycarbonates | polycarbonate Z resin |
| acrylic resin | methacrylic resin |
| polyvinyl chloride | polyvinylidene chloride |
| polystyrene | styrene-butadiene copolymer |
| polyvinyl acetate | polyvinyl formal |
| polyvinyl butyral | polyvinyl acetal |
| polyvinyl carbazole | styrene-alkyd resin |
| silicone resin | silicone-alkyd resin |
| polyester | phenolic resin |
| polyurethane | epoxy resin |
| vinylidene chloride-acrylonitrile copolymer | |
| vinyl chloride-vinyl acetate copolymer | |
| vinyl chloride-vinyl acetate-maleic anhydride copolymer. | |

These binders may be used either on their own or as admixtures. The carrier generation material is generally used in an amount of 10 –600 parts by weight, preferably 50–400 parts by weight, per 100 parts by weight of the binder, and the carrier transport material is generally used in an amount of 10–500 parts by weight per 100 parts by weight of the binder.

The thus formed carrier generation layer preferably has a thickness of 0.01-20 μm, with the range of 0.05-5 μm being more preferred. The carrier transport layer generally has a thickness of 1-100 μm, preferably 5-30 μm.

In order to improve sensitivity or reduce residual potential or fatigue due to cyclic use, the light-sensitive layer of the electrophotographic photoreceptor of the present invention may contain one or more electron-accepting materials. Useful electron-accepting materials are selected from among the following compounds having high electron affinity: succinic anhydride, maleic anhydride, dibromosuccinic anhydride, phthalic anhydride, tetrachlorophthalic anhydride, totrabromophthalic anhydride, 3-nitrophthalic anhydride, 4-nitrophthalic anhydride, pyromellitic anhydride, melitic anhydride, tetracyanoethylene, tetracyanoquinodimethane, o-dinitrobenzene, m-dinitrobenzene, 1,3,5-trinitrobenzene, p-nitrobenzonitrile, picryl chloride, quinone chlorimide, chloranil, bromanil, dichlorodicyano-p-benzoquinone, anthraquinone, dinitroanthraquinone, 9-fluorenylidene-(malonodinitrile), polynitro-9-fluorenylidene-(malonodinitrile), picric acid, o-nitrobenzoic acid, p-nitrobenzoic acid, 3,5-dinitrobenzoic acid, pentafluorobenzoic acid, 5-nitrosalicylic acid, 3,5-dinitrosalicylic acid, phthalic acid, and mellitic acid.

These electron-accepting materials are used in such amounts that the weight ratio of carrier generation material to electron-accepting material is in the range of from 100:0.01 to 100:200, preferably from 100:0.1 to 100:100.

Antioxidants, photo-stabilizers and other agents to prevent deterioration may be incorporated in the light-sensitive layer for the purpose of improving its storage stability, endurance, and resistance to environments.

The support on which the light-sensitive layer is to be formed may be a metal plate, a metal drum or a thin conductive layer that is made of a conductive polymer, a conductive compound such as indium oxide or a metal such as aluminum or palladium and which is coated, vapor-deposited, laminated or otherwise formed on a substrate such as paper or a plastic film.

Having the construction described above, the electrophotographic photoreceptor of the present invention has improved charging characteristic, sensitivity characteristic and resistance to cyclic use as will be understood from the examples that follow.

SYNTHESIS EXAMPLE 1

Titanium tetrachloride (14.7 ml) was added dropwise to a mixture of phthalodinitrile (65 g) and α-chloronaphthalene (500 ml) in a nitrogen stream. Thereafter, the reaction mixture was slowly heated to 200° C. and stirred for 3 h at 200°–220° C. to complete the reaction. Subsequently, the reaction mixture was left to cool to 130° C. and filtered while hot. The cake on the filter was washed with α-chloronaphthalene, washed with methanol several times and further washed with hot water (80° C.) several times.

Figure 4:
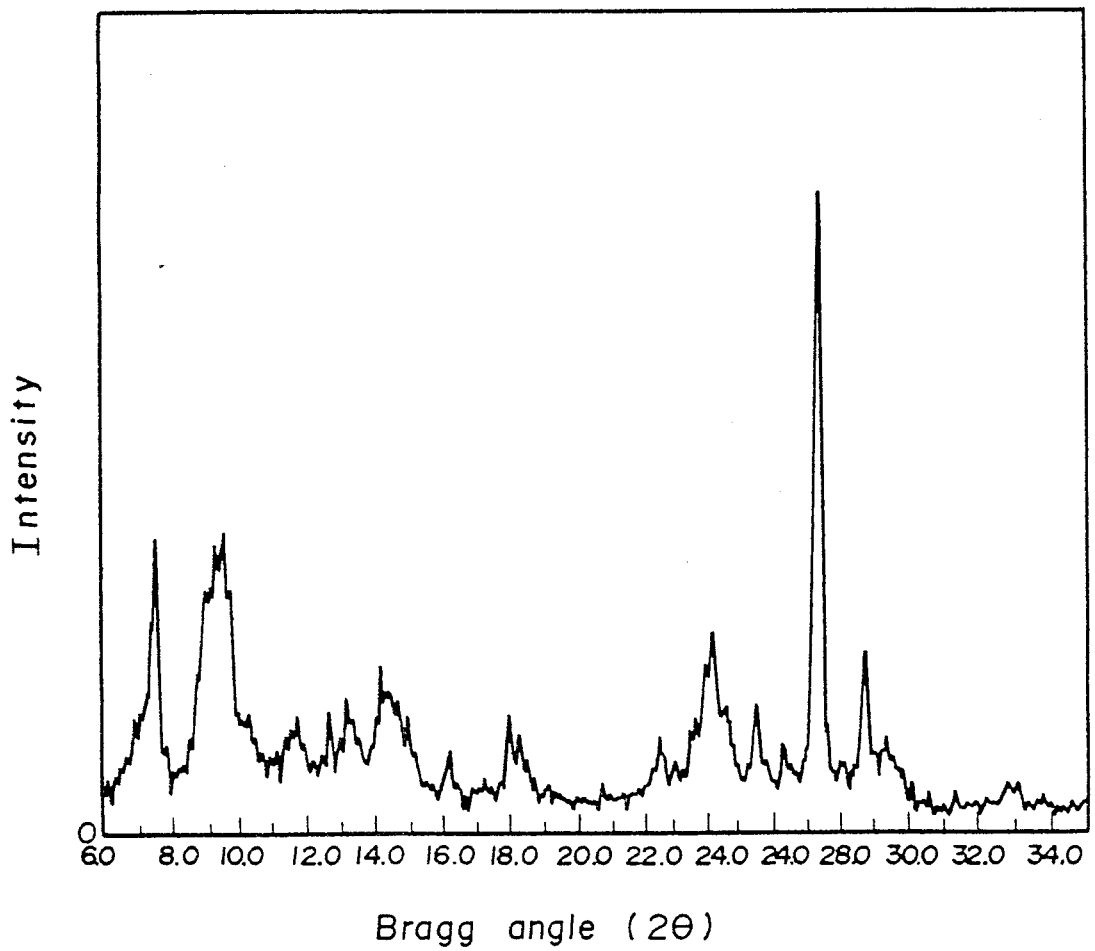
FIG. 4 is an X-ray diffractometer scan for the titanyl phthalocyanine to be used in the present invention which contains a small amount of an alpha-form.

To the thus obtained Nutsche cake, o-dichlorobenzene was added and the mixture was milled with a sand grinder at a temperature in the range of 40°-60° C. After dilution with methanol, the mixture was filtered and washed with acetone and methanol to obtain a sample of the titanyl phthalocyanine that is to be used in the present invention. As shown in FIG. 4, this titanyl phthalocyanine was a crystal having a maximum intensity peak at a Bragg angle (2 $\theta$) of 27.3° and characteristic peaks at 9.5°, 9.7°, 11.7° and 24.1° in X-ray diffraction. At the same time, it contained a small amount of α-titanyl phthalocyanine.

SYNTHESIS EXAMPLE 2

The Nutsche cake obtained in Synthesis Example 1 was dried and a portion (5 g) of it was stirred in 100 g of 96% sulfuric acid at 3°-5° C. The sulfuric acid solution obtained by subsequent filtration was poured into 1.5 liters of water and the precipitating crystal wa recovered by filtration. This crystal was washed with water repeatedly until the washings became neutral.

Figure 5:
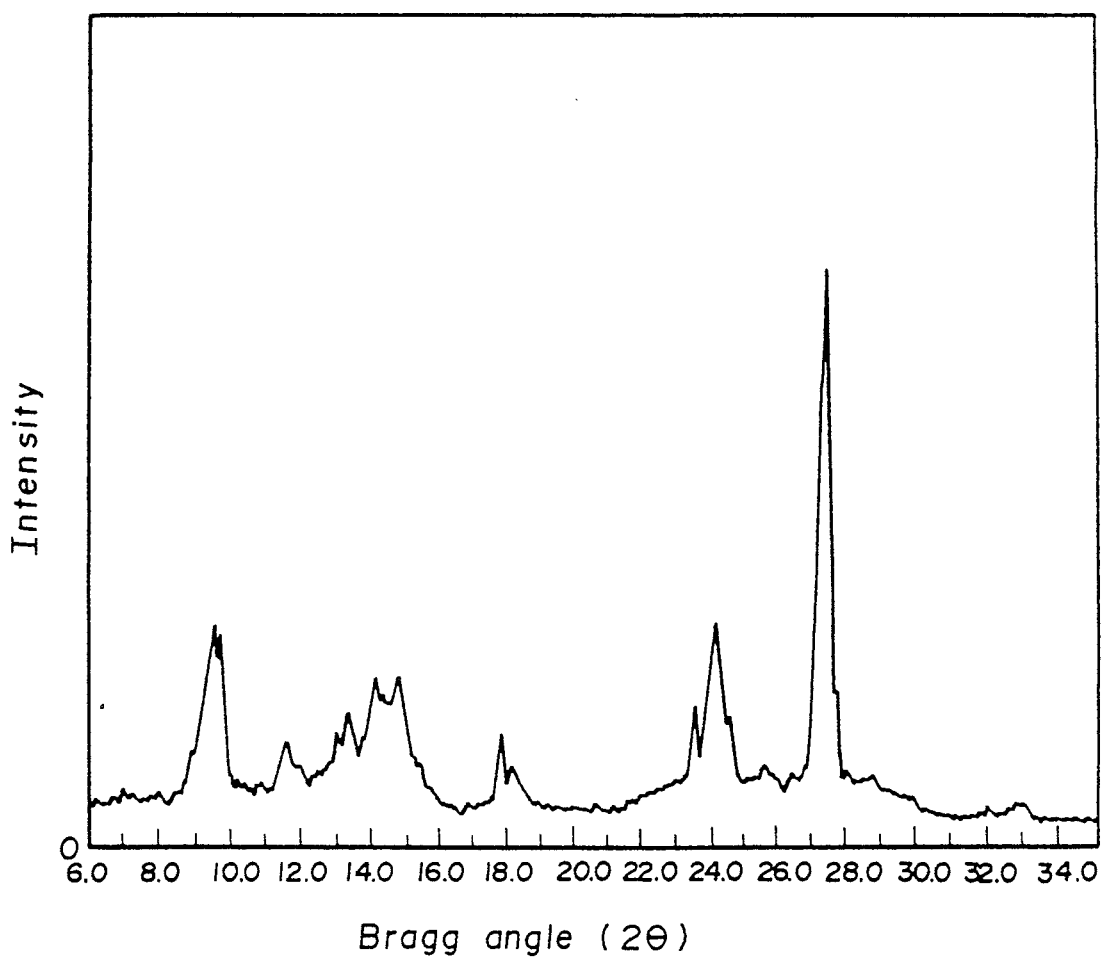
FIG. 5 is an X-ray diffractometer scan for the titanyl phthalocyanine prepared in Synthesis Example 2.

To the thus obtained Nutsche cake, 1,2-dichloroethane was added and the mixture was stirred at room temperature for 1 h. By subsequent filtration and washing with methanol, a sample of the crystal to be used in the present invention was obtained. As shown in FIG. 5, this crystal had a maximum intensity peak at a Bragg angle (2 $\theta$) of 27.3° and characteristic peaks at 9.6°, 11.7° and 24.1°

COMPARATIVE SYNTHESIS EXAMPLE 1

Figure 6:
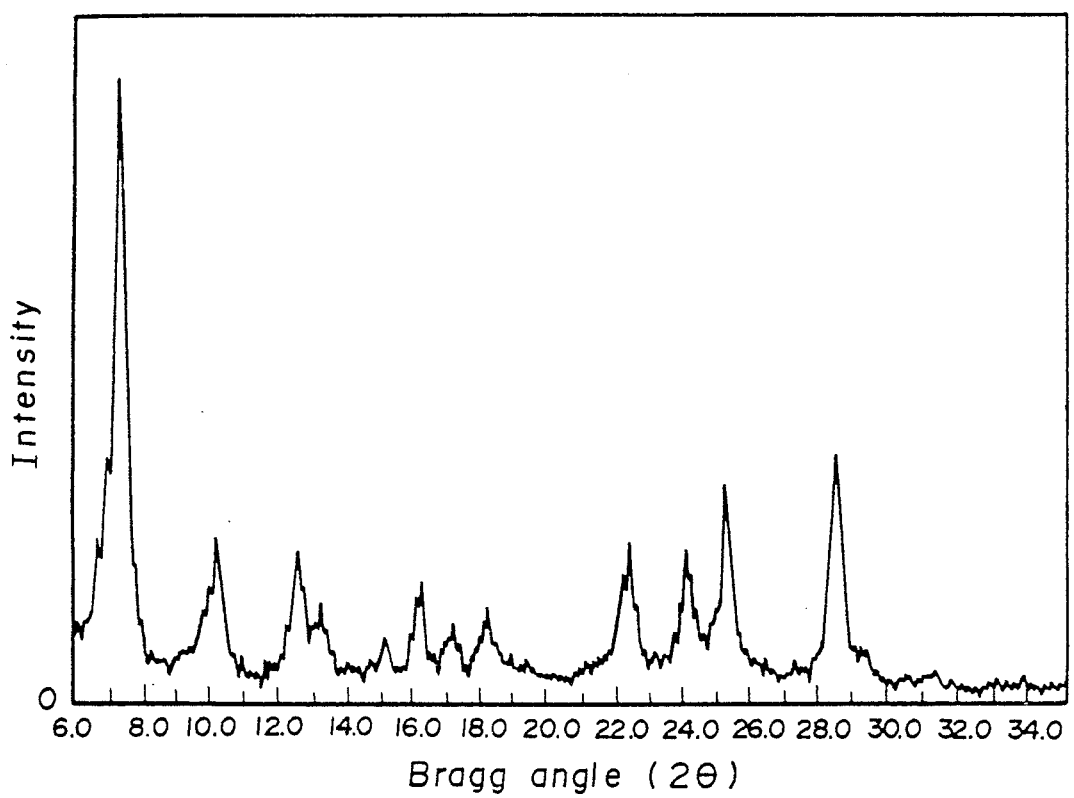
FIG. 6 is an X-ray diffractometer scan for the alphatitanyl phthalocyanine prepared in Comparative Synthesis Example 1.

The Nutsche cake obtained in Synthesis Example 2 was dried and milled in the presence of methyl cellosolve to obtain α-titanyl phthalocyanine having the X-ray diffractometer scan shown in FIG. 6.

EXAMPLE 1

Three parts by weight (all "parts" to that are appear hereinafter are on a weight basis) of an ethylene-vinyl acetate copolymer ("Sumitate KA10" of Sumitomo Chemical Co., Ltd.) was dissolved in 100 parts of toluene with heat and the solution was passed through a 0.6-μm filter. It was then dip-coated onto the surface of an aluminum drum to form an intermediate layer 0.5 μm thick.

Figure 7:
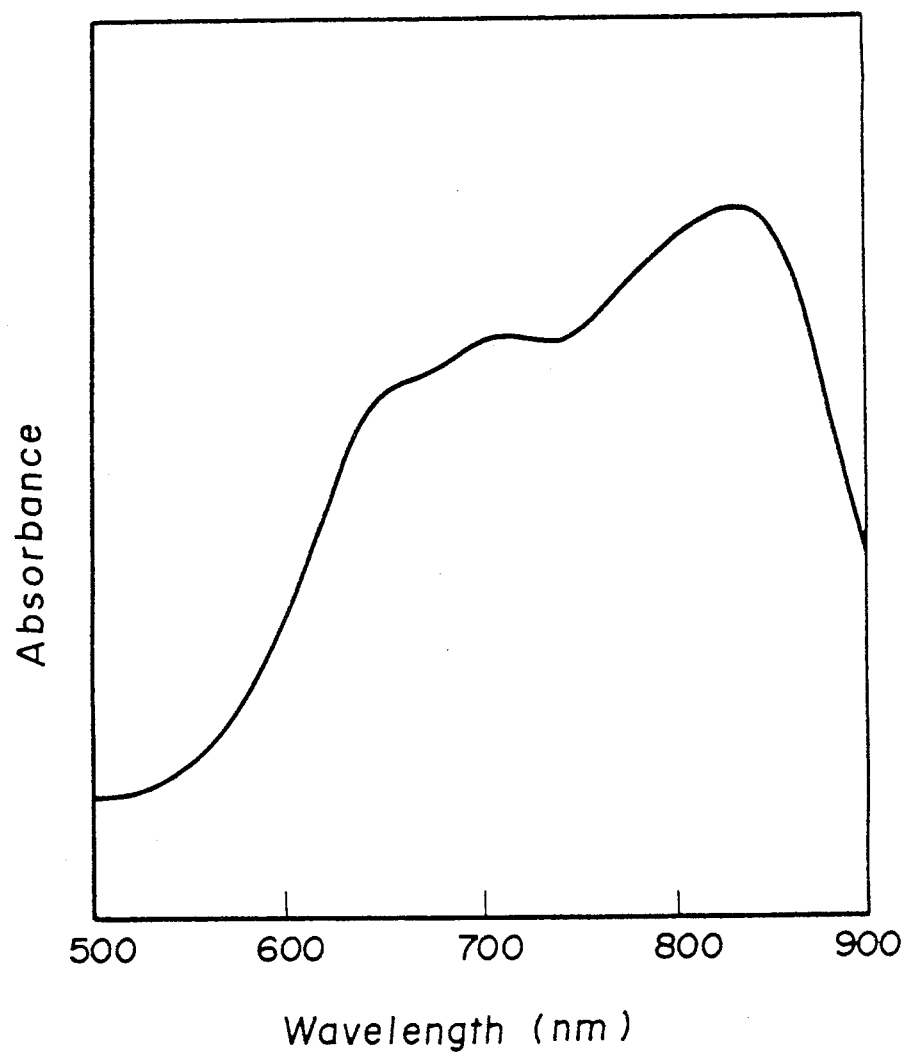
FIGS. 7 and 8 are absorption spectra of the photoreceptors fabricated in Examples 1 and 5, respectively.

Three parts of the titanyl phthalocyanine obtained in Synthesis Example 2 which had the X-ray diffractometer scan shown in FIG. 5 and 20 parts of a binder resin (silicone resin "KR-5240" of Shin-Etsu Chemical Co., Ltd. dissolved in 15% xylene/butanol) were dispersed in 100 parts of methyl ethyl ketone (dispersion medium) by means of a sand mill. The dispersion was dip-coated onto the previously formed intermediate layer to form a carrier generation layer 0.2 μm thick. Subsequently, a solution having 1 part of a carrier transport material (T-1), 1.5 parts of a polycarbonate resin ("Jupilon Z200" of Mitsubishi Gas Chemical Co., Inc.) and a trace amount of silicone oil ("KF-54" of Shin-Etsu Chemical Co., Ltd.) dissolved in 10 parts of 1,2-dichloroethane was dip-coated onto the carrier generation layer and dried to form a carrier transport layer 25 μm thick. The so fabricated photoreceptor was designated as sample No. 1. The absorption spectrum of this photoreceptor was as shown in FIG. 7.

COMPARATIVE EXAMPLE 1

A comparative photoreceptor was fabricated by repeating the procedure of Example 1 except that the titanyl phthalocyanine having the X-ray diffractometer scan shown in FIG. 5 was replaced by a comparative titanyl phthalocyanine having the X-ray diffractometer scan shown in FIG. 6. This comparative photoreceptor was designated as comparative sample No. 1.

COMPARATIVE EXAMPLE 2

Another comparative photoreceptor was fabricated as in Example 1 except that no intermediate layer was provided. This comparative photoreceptor was designated as comparative sample No. 2.

COMPARATIVE EXAMPLE 3

Still another comparative photoreceptor was fabricated as in Example 1 except that the intermediate layer was composed of a polyester resin ("Vylon 300" of Toyobo Co., Ltd.). This comparative photoreceptor was designated as comparative sample No. 3.

COMPARATIVE EXAMPLE 4

Yet another comparative photoreceptor was fabricated as in Example 1 except that the intermediate layer was composed of a polycarbonate resin ("Panlite L-1250" of Teijin Chemicals Ltd.). This comparative photoreceptor was designated as comparative sample No. 4.

EXAMPLES 2-4

Photoreceptors were fabricated as in Example 1 except that the intermediate layer was composed of one of the ethylene copolymers shown in Table 1 below. These photoreceptors were designated as sample Nos. 2-4.

EXAMPLE 5

Figure 8:
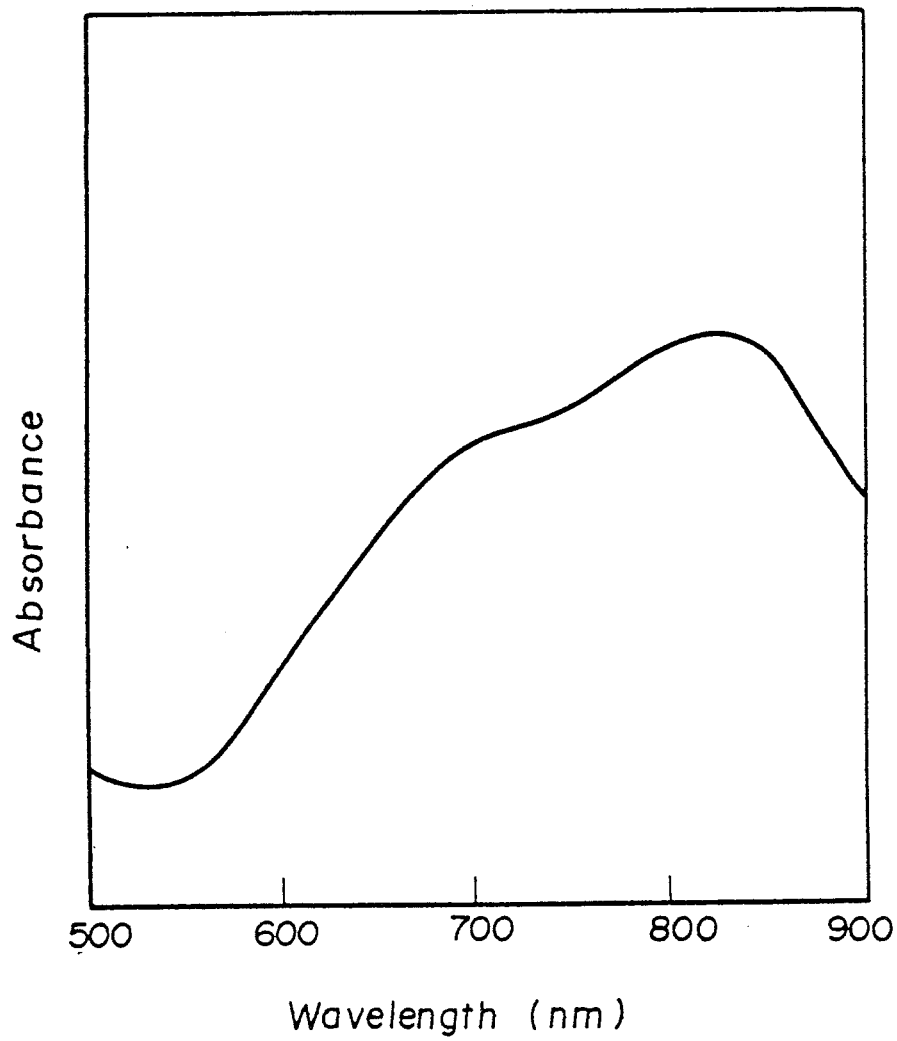

Four parts of a soluble nylon resin ("Lakkamide 5003" of Dainippon Ink & Chemicals Co., Inc.) was dissolved in 100 parts of methanol with heat and the solution was passed through a 0.6-μm filter. It was then dip-coated onto the surface of an aluminum drum to form an intermediate layer 0.6 μm thick. Three parts of the titanyl phthalocyanine prepared in Synthesis Example 1 and which had the X-ray diffractometer scan shown in FIG. 4 and 1.5 parts of a polyvinyl butyral resin ("XYHL" of Union Carbide Corporation) were dispersed in 100 parts of methyl ethyl ketone (dispersion medium) by means of a sand mill. The resulting dispersion was dip-coated onto the previously formed intermediate layer to form a carrier generation layer 0.3 μm thick. Subsequently, a solution having 1 part of a carrier transport material (T-2), 1.3 parts of a polycarbonate resin ("Panlite K-1300" of Teijin Chemicals Ltd.) and a trace amount of silicone oil ("KF54" of Shin-Etsu Chemical Co., Ltd.) dissolved in 10 parts of 1,2-dichloroethane was dip-coated onto the carrier generation layer and dried to form a carrier transport layer 20 μm thick. The so fabricated photoreceptor was designated as sample No. 5. The absorption spectrum of this photoreceptor was as shown in FIG. 8.

EXAMPLES 6 AND 7

Additional photoreceptors were fabricated as in Example 5 except that the intermediate layer was composed of one of the polyamide resins shown in Table 1. The so fabricated photoreceptors were designated as sample Nos. 6 and 7.

TABLE 1

| Example No. | Sample No. | Intermediate layer |
|---|---|---|
| 2 | 2 | Sumitate KA-20 (Sumitomo Chemical Co., Ltd.) |
| 3 | 3 | Evaflex A-703 (Mitsui Du Pont Polychemical Co., Ltd.) |
| 4 | 4 | Evaflex A-704 (Mitsui Du Pont Polychemical Co., Ltd.) |
| 5 | 5 | Lakkamide 5003 (Dainippon Ink & Chemicals Inc.) |
| 6 | 6 | CM 8000 (Toray Industries, Ltd.) |
| 7 | 7 | Diamide X1874M (Daicel-Hulse Co., Ltd.) |

Evaluation

The samples were set in a laser printer adapted from "U-Bix 1550" of Konica Corp. and equipped with Laser Diode as a light source. The grid voltage was adjusted so that the potential in the unexposed area, $V_H$, would be $-700\pm10$ volts, and the potential in the exposed area, $V_L$, was measured upon irradiation at 0.7 nW. Reversal development was effected at a developing bias of $-600$ volts and the quality of copy image was evaluated in terms of black spots in the white background by counting the number of black spots ($\geq 0.05$ mmΦ) per square centimeter with an image analyzer "Ominicon Model 3000" (Shimadzu Corp.). The results were evaluated by the following criteria: O, no more than one black point per cm$^2$; Δ, 2–10 black spots per cm$^2$; X, 11 or more black spots per cm$^2$. The results of evaluation are shown in the following table 2.

TABLE 2

| Sample No. | $V_L$ (V) | Black spot |
|---|---|---|
| Sample 1 | −30 | |
| Sample 2 | −30 | |
| Sample 3 | −35 | |
| Sample 4 | −30 | |
| Sample 5 | −45 | |
| Sample 6 | −45 | |
| Sample 7 | −50 | |
| Comparative sample 1 | −80 | X |
| Comparative sample 2 | −25 | X |
| Comparative sample 3 | −30 | X |
| Comparative sample 4 | −30 | X |

As is clear from the above results, the electrophotographic photoreceptors fabricated in accordance with the present invention had high sensitivity and yet the image produced had few defects, in particular, very few black spots when reversal development was effected.

We claim:

1. An electrophotographic photoreceptor comprising:
   a support;
   an intermediate layer on said support or an electroconductive layer, said intermediate layer comprising an ethylene copolymer resin or a polyamide resin; and
   a light-sensitive layer on said intermediate layer, said light-sensitive layer comprising titanyl phthalocyanine in a crystalline state, wherein said titanyl phthalocyanine has a maximum intensity peak of the Bragg angle 2 $\theta$ at 25.2°±0.2° and crystal planes corresponding to diffraction lines at 9.6°±0.2°, 11.7°±0.2° and 24.1°±0.2° in a diffraction spectrum obtained with X-rays of Cu KÅ at a wavelength of 1.541 Å, and said titanyl phthalocyanine has a maximum absorption in the range of 780-860 nm in a near infrared absorption spectrum.

2. An electrophotographic photoreceptor according to claim 1, wherein said ethylene copolymer resin is a copolymer of alkylene monomers with at least one member selected from the group consisting of vinyl acetate, acrylic acid, methacrylic acid, acrylate esters and methacrylate esters.

3. An electrophotographic photoreceptor according to claim 2, wherein said alkylene monomers are ethylene.

4. An electrophotographic photoreceptor according to claim 1, wherein the amount of comonomer to be copolymerized with an alkylene monomer to form said ethylene copolymer resin is 5–50 wt %.

5. An electrophotographic photoreceptor according to claim 1, wherein the amount of comonomer to be copolymerized with an alkylene monomer to form said ethylene copolymer resin is 10–40 wt %.

6. An electrophotographic photoreceptor according to claim 1, wherein said polyamide resin is a copolymer nylon or a nylon resin which has been modified to become soluble in water or alcohols.

7. An electrophotographic photoreceptor according to claim 1, wherein said intermediate layer has a thickness of 10 μm or less.

8. An electrophotographic photoreceptor according to claim 1, wherein said intermediate layer has a thickness of 4 μm or less.

9. An electrophotographic photoreceptor according to claim 1, wherein said light-sensitive layer contains as carrier transport materials at least one member selected from the group consisting of compounds having nitrogenous heterocyclic nuclei or condensed rings thereof, polyarylalkane compounds, pyrazoline compounds, hydrazone compounds, triarylamine compounds, styryl compounds, styryltriphenylamine compounds, β-phenylstyryl triphenylamine compounds, butadiene compounds, hexatriene compounds, carbazole compounds, and condensed polycyclic compounds.

10. An electrophotographic photoreceptor according to claim 1, wherein the amount of carrier generation materials to be contained in said light-sensitive layer is from 10 to 600 parts by weight per 100 parts by weight of the binder.

11. An electrophotographic photoreceptor according to claim 1, wherein the amount of carrier generation material to be contained in said light-sensitive layer is from 50 to 400 parts by weight per 100 parts by weight of the binder.

12. An electrophotographic photoreceptor according to claim 1, wherein the amount of carrier transport material to be contained in said light-sensitive layer is from 10 to 500 parts by weight per 100 parts by weight of the binder.

13. An electrophotographic photoreceptor according to claim 1, wherein said light-sensitive layer is composed of a carrier generation layer and a carrier transport layer.

14. An electrophotographic photoreceptor according to claim 13, wherein said carrier generation layer has a thickness of 0.01–20 μm.

15. An electrophotographic photoreceptor according to claim 13, wherein said carrier generation layer has a thickness of 0.05–5 μm.

16. An electrophotographic photoreceptor according to claim 13, wherein said carrier transport layer has a thickness of 1–100 μm.

17. An electrophotographic photoreceptor according to claim 13, wherein said carrier transport layer has a thickness of 5–30 μm.

18. The electrophotographic photoreceptor of claim 1 wherein said light-sensitive layer contains at least one member selected from the group consisting of phthalocyanine pigments, azo pigments, anthraquinone pigments, perylene pigments, polycyclic quinone pigments and squarium pigments.

19. The electrophotographic photoreceptor of claim 18 wherein one of said phthalocyanine pigments is α-titanyl phthalocyanine, β-titanyl phthalocyanine, titanyl phthalocyanine of mixed α- and β-forms, or amorphous titanyl phthalocyanine.

* * * * *

UNITED STATES PATENT AND TRADEMARK OFFICE
CERTIFICATE OF CORRECTION

PATENT NO. : 4,994,339
DATED : February 19, 1991
INVENTOR(S) : A. KINOSHITA, etal It is certified that error appears in the above-identified patent and that said Letters Patent is hereby corrected as shown below:

Column 15, line 32, change "25.2°" to --27.2°--
Col. 15, line 35, change "Cu kÅ" to --Cu kα--

Signed and Sealed this

First Day of June, 1993

Attest:

MICHAEL K. KIRK

*Attesting Officer*  *Acting Commissioner of Patents and Trademarks*